Jan. 1, 1929.  A. L. THURSTON  1,697,151
AEROFOIL OR WING CONSTRUCTION FOR AIRCRAFT
Original Filed June 13, 1923  2 Sheets-Sheet 2
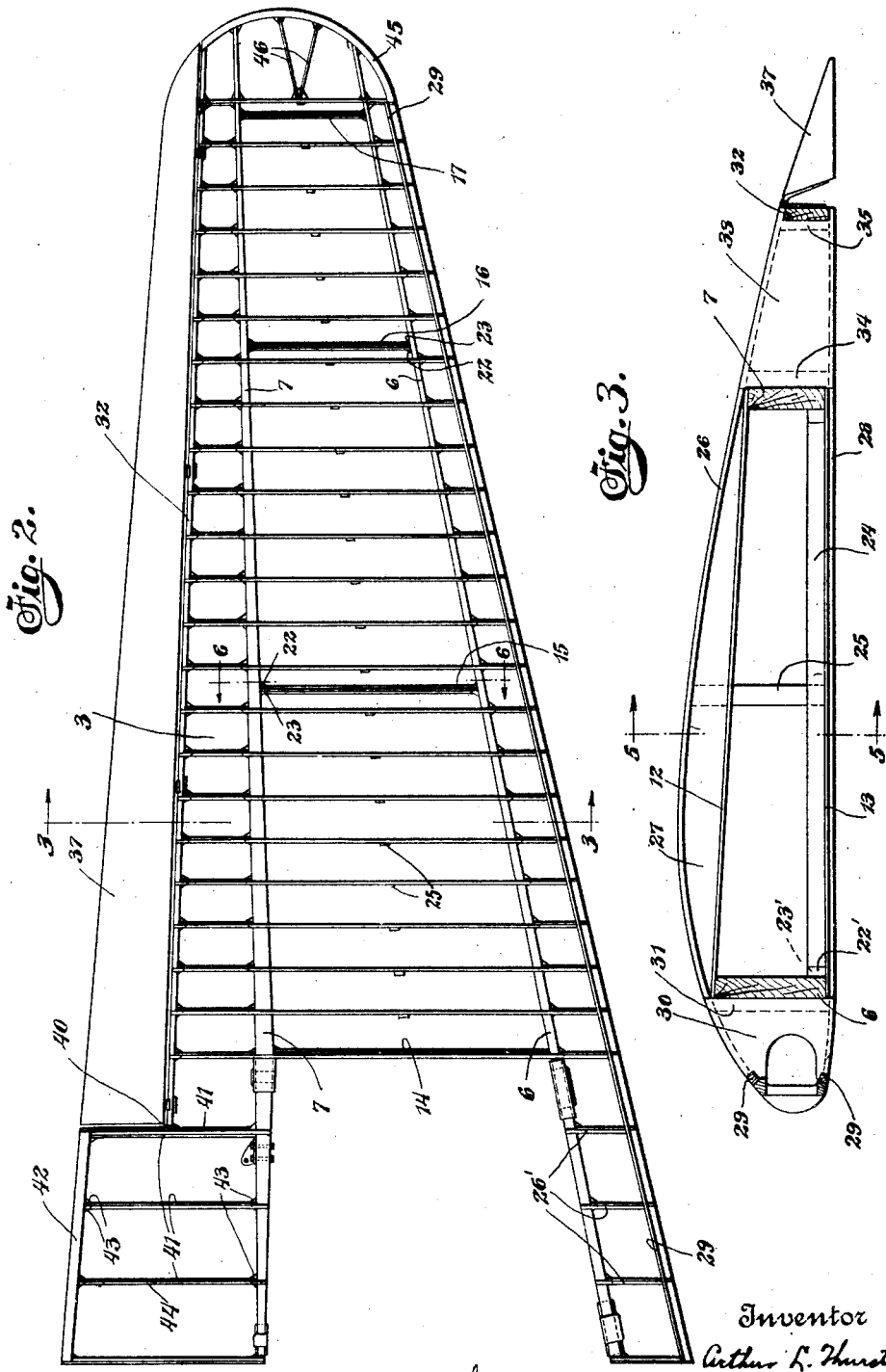

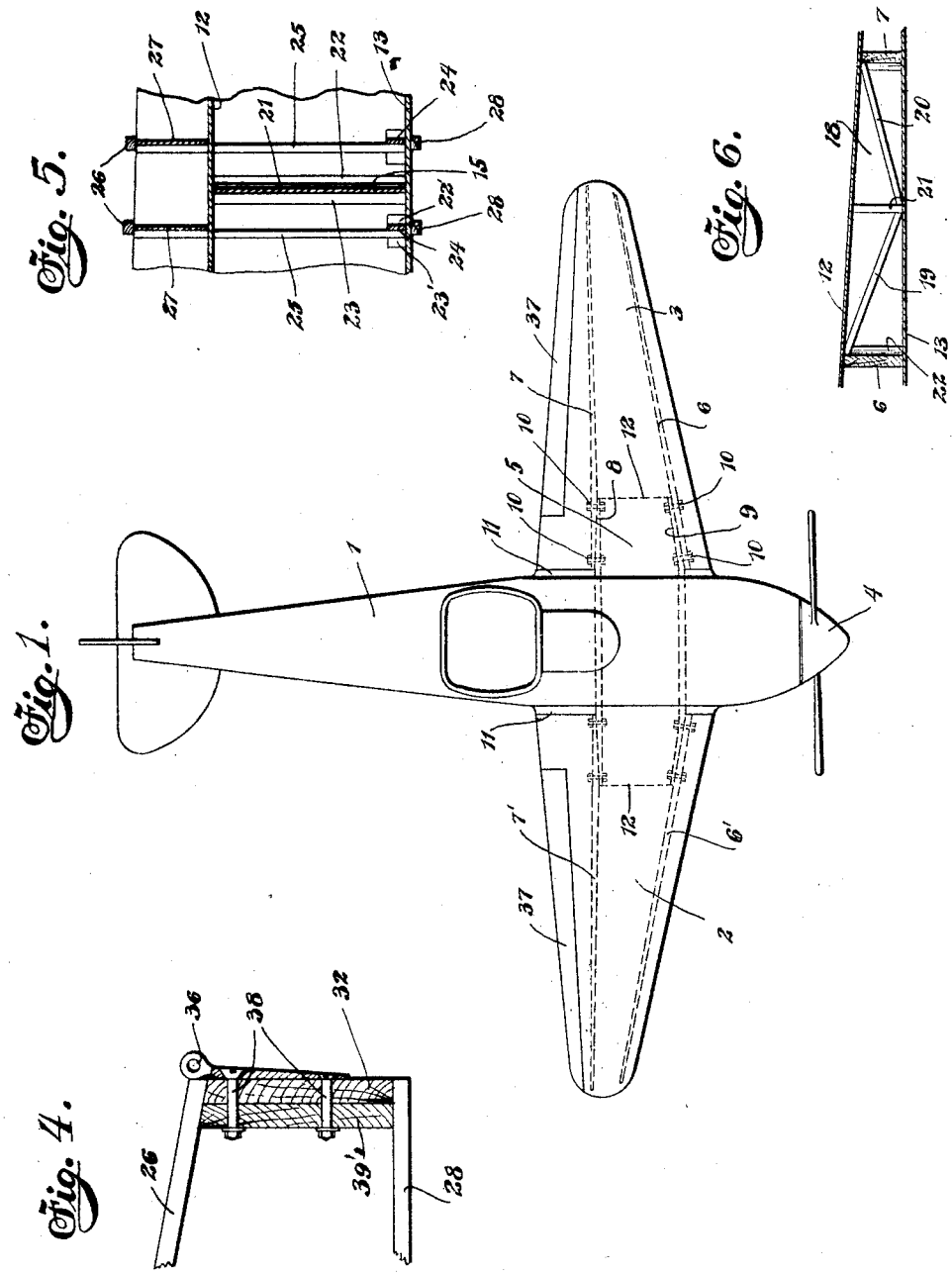

Patented Jan. 1, 1929.

1,697,151

UNITED STATES PATENT OFFICE.

ARTHUR L. THURSTON, OF HAMMONDSPORT, NEW YORK, ASSIGNOR TO CHARLES H. KEEL, TRUSTEE, OF NEW YORK, N. Y.

AEROFOIL OR WING CONSTRUCTION FOR AIRCRAFT.

Application filed June 13, 1923, Serial No. 645,014. Renewed May 16, 1928.

This invention relates to aerofoil or wing constructions particularly for aeroplanes, although certain features of the invention are applicable generally to aerofoil constructions.

The object of the invention generally is a wing possessing novel features of construction which enable it to be designed with more scientific and mathematical accuracy and whereby the proportions of the various parts thereof may be chosen and arranged with reference to each other to give a substantially uniform factor of safety throughout. Such a wing may with certainty be designed with the required factor of safety without unnecessary weight and useless load.

I have illustrated one embodiment of my new wing in this application wherein:

Fig. 1 is a plan view of an aeroplane of the monoplane type embodying my invention;

Fig. 2 is a bottom view of my wing with certain parts broken away to bring out the distinguishing features;

Fig. 3 is a cross section on the line 3—3 of Fig. 2;

Fig. 4 is a detailed sectional view of a portion of the wing false beam;

Fig. 5 is a section along the lines 5—5 of Fig. 3; and

Fig. 6 is a section along the lines 6—6 of Fig. 2 showing certain of the wing parts in elevation.

Referring to the drawings where like numerals designate similar parts throughout, an aeroplane is illustrated having a main body 1, supporting right and left wings 2 and 3, and a propeller 4 for driving the plane through the air at air sustaining speed. In the embodiment illustrated the right and left wings 2 and 3 fit on to an intermediate wing section or stub wing 5, the latter having its surfaces form continuations of the surfaces of the wing sections 2 and 3 and having its underside substantially flush with the underside of the main body 1. The wings are generally of a tapering form, as illustrated, each right and left wing section having a pair of beams 6 and 7 which fit over the stud wing beams 8 and 9 and are attached thereto by the fittings indicated diagrammatically by the numeral 10. Each pair of beams 6 and 7 converge in the outward direction and the stub beams 8 and 9 are tapered and bent to form a snug fit with the inner ends thereof.

The wing sections 2 and 3 abut up against the fuselage 1 along the lines 11 and fit against the end of the stub wings 12 to form continuous aerofoil surfaces. This general arrangement of wing and fuselage assembly is claimed in another application Serial Number 645,012 filed on June 13, 1923, in the name of myself and Harry T. Booth.

The invention claimed herein relates more particularly to the construction of the wing sections 2 and 3 and a description of one of these constructions will suffice. The beams 6 and 7 form the backbone of the wing and are of a tapered form throughout corresponding to the forces to be carried at any point along their length in the operation of the craft. The front beam 6 is slightly wider or deeper than the rear beam 7 and both of them extend throughout the wing to the wing tip. One feature of the wing is the box-like or bulkhead construction embodying the front beam 6 and the rear beam 7, which form the main supporting members for the wing, the sheets of veneer carried respectively by the top and bottom sides of these beams, the upper sheet being indicated by the numeral 12 and the lower sheet being indicated by the numeral 13, and the bulkheads 14, 15, 16 and 17. These sheets of veneer 12 and 13 tend to give form and rigidity to the beams 6 and 7 and the whole is further reinforced by the four bulkheads or reinforced partitions (14, 15, 16 and 17) which abridge the wing beams and support the sheets 12 and 13 and whose ends abut against the inner sides of the beams. These bulkheads divide the interior of the wing into three box-like compartments. Each bulkhead consists of a central web or partition 18 whose forward end is of the same depth as the wing beam 6 at that point and whose rear end is of the depth of the rear beam 7 at that point, the underside resting against the bottom sheet 13 and the upper side reinforcing the top sheet 12. Each bulkhead web is reinforced by having on one side thereof a pair of reinforcing strips 19 and 20 which I position with their inner ends abutting against each other and against the lower sheet covering 13 and extend upwardly at an angle with their outer ends engaging the upper sheet covering 12 at points adjacent the ends of the web 18. A stiffening post 21 also extends upwardly from the inner abutting ends of the reinforcing strips 19 and 20 and engages the upper cover 12 at its upper end. The reinforcing strips 19 and 20 and reinforcing post 21 may be duplicated, if desired, for each bulkhead web 18 so as to have both sides reinforced; and each web is further provided at either end with a pair of reinforcing and attaching corner blocks 22 and 23, the whole being secured in any suitable manner to the insides of the beams 6 and 7. This box-like structure comprising the beams 6 and 7, the bulkheads and the sheet veneer layers 12 and 13 is further reinforced by a multiplicity of horizontal stiffening strips 24 which extend transversely of the wing, rest upon the lower sheet covering 13 and have their ends abutting against the inner sides of the beams 6 and 7. These are securely fastened to the beams 6 and 7 in any convenient manner as, for example, through the medium of the corner attaching blocks 22' and 23'. Each strip 24 carries a stiffening post 25 which extends vertically up through the upper cover 12. In a line with these reinforcing strips 24 and vertical stiffening post 25 there are disposed transverse upper cap strips 26 and, in order to give the desired curvature to the upper part of the wing there are disposed underneath the cap strips 26 the vertical webs 27, these webs tapering to points at their opposite ends and resting with their forward and rear ends respectively upon the front and rear beams 6 and 7. The upper sides of these webs 27 are curved to give the desired curvature and the cap strips 26 rest thereupon. The reinforcing posts 25 are secured to the lower reinforcing strips 24 and extend upwardly to the corresponding cap strips 26 for the purpose of reinforcing vertical webs 27. In line with the upper cap strips 26 there are also provided the lower cap strips 28 which are attached to the bottom sheet veneer covering 13. The cap strips 26 and 28 extend forwardly of the front beam 6 and are attached to the leading edge stringers 29. Nose webs 30 are disposed between the overlapping strips and are secured thereto and to the stringers 29 to give the desired nose construction and contour. The nose webs 30 are anchored to the front side of the beam 6 by means of the corner reinforcing blocks 31. Similarly the cap strips 26 and 28 extend rearwardly of the beam 7 and have their outer ends attached respectively to the upper and undersides of a false beam 32, this latter beam extending at a slight angle to the beam 7 and there being disposed a reinforcing tail web 33 between each pair of overhanging cap strips 26 and 28. Each of the tail webs 33 is attached to the rear side of the rear beam 7 through the medium of corner reinforcing blocks 34 and to the false beam 32 by means of the reinforcing blocks 35. The false beam 32 carries the hinges 36 for an aileron 37, the hinges being fastened to the false beam through the medium of bolts 38. A reinforcing block 39 is provided on the backside of the false beam at each point where the hinges 36 are attached.

The stringers 29 extend to points in line with the inner end of the front beam and the nose webs 30 with their reinforcing blocks are continued to the extreme inner end of the beam and short cap strips 26' of sufficient length to bridge the front beam and the stringers are provided above and below these end nose webs. The false beam 32 is discontinued at 40. Webs 41 of the desired contour extend out from the rear side of the rear beam 7 and are attached to a trailing edge member 42, these webs being secured to the beam 7 and the member 42 by means of the corner blocks 43. Cap strips 44 are disposed on the upper side of these webs. There are similar cap strips underneath these webs.

The false beam 32 and the stringers 29 are connected together at the wing tip through the medium of the tip bow 45 which is bowed around and engages the outer ends of the front and rear beams, as indicated, and intermediate the beams are disposed a pair of braces 46 which extend inwardly with their ends abutting against the center of the end reinforcing stiffener 24.

Any suitable covering for the wing may be provided as, for example, veneer or cloth, or the same may be covered by a wing radiator of the surface type invented and developed by me.

I claim:

1. An aerofoil construction for aircraft comprising a pair of elongated front and rear beams, at least two bulkheads bridging said beams, sheet covers for the upper and lower sides of said beams and bulkheads and forming therewith a rigid box-like frame, and a contour frame secured to the upper surface of the box-like structure for carrying a suitable lifting surface, said contour frame being separate from and independent of the bulkheads.

2. An aerofoil comprising a pair of elongated beams which are spaced from each other and bridged by a multiplicity of bulkheads and sheet covers therefor, together with a multiplicity of reinforcing strips also bridging the beams and disposed intermediate the bulkheads.

3. An aerofoil construction for aeroplanes comprising a pair of elongated beams, one being of greater depth than the other and both converging towards each other from their inner ends, sheet coverings for both the upper and under sides of said beams and a multiplicity of bulkheads bridging the beams and disposed between the sheet covers thereby forming a box-like frame having a multiplicity of closed compartments of decreasing depth from the beam of greater depth to the beam of lesser depth, and a contour frame secured to the upper surface of the box-like structure for carrying a suitable lifting surface.

4. An aerofoil construction for aeroplanes comprising a pair of elongated beams, a multiplicity of bulkheads bridging said beams, sheet stiffening covers for both the under and upper sides of said beams and said bulkheads, nose and tail webs extending out from the outer sides of said beams transversely thereto for giving form to and forming the nose and trailing edges of the wing, and a contour frame secured to the upper part of the box frame for carrying a suitable lifting surface, said contour frame being separate from and independent of the bulkheads.

5. An aerofoil construction for aeroplanes comprising a pair of elongated beams, a multiplicity of bulkheads bridging said beams at different points throughout their length, a pair of sheet covering stiffeners attached to the under and upper sides of said beams and forming with said bulkheads a multiplicity of closed compartments, a multiplicity of transverse webs resting upon the upper cover with a multiplicity of cap strips resting thereupon and extending beyond both the rear and the front beams together with nose and tail webs disposed under the overhanging ends of the cap strips and continuing the character of the curvature of that of the intermediate webs.

6. An aerofoil construction for aeroplanes comprising elongated beams spaced from each other and bridged by a multiplicty of bulkheads, a pair of sheet covering stiffeners secured to the upper and under sides of said beams and forming with said beams and said bulkheads a plurality of closed compartments, a plurality of cap strips carried on the under and upper sides of said frame and extending forwardly of the front beam and rearwardly of the rear beam, a plurality of webs of the desired upper curvature disposed above the beams and under the upper cap strip and a plurality of nose webs and tail webs disposed between the overhanging ends of said cap strips together with stringers on the nose of the wing to which the cap strips are attached and a false beam to the rear of the beam and carried by the overhanging ends of said cap strips.

7. An aerofoil of the character set forth in claim 6 having a plurality of reinforcing strips disposed between the bulkheads and attached to the beams and a plurality of stiffening posts extending upwardly from the stiffening strips to the upper cap strips.

8. A wing construction of the character set forth in claim 6 wherein the front beam is of greater depth than the rear beam and both of them taper gradually in all dimensions from a point adjacent their inner ends outwardly and converge towards each other.

9. An aerofoil comprising a pair of elongated beams which are spaced from each other and bridged by a multiplicity of bulkheads and sheet covers therefor, together with a multiplicity of reinforcing strips also bridging the beams and disposed intermediate the bulkheads and a contour frame superposed thereon for carrying a suitable lifting surface.

10. An aerofoil structure of the character set forth in claim 1 having a false beam carried rearwardly of the rear beam for the accommodation of a control device.

11. An aerofoil structure of the character set forth in claim 1 having a false beam member carried rearwardly of the rear beam, said false beam being discontinued near the root of the wing and a nose structure carried forwardly of the front beam.

12. An aerofoil comprising a pair of elongated beams which are spaced from each other and bridged by a multiplicity of bulkheads and sheet coverings therefor, together with a multiplicity of reinforcing strips also bridging the beams and disposed intermediate the bulkheads, and a contour frame superposed thereon including curved web members with vertical reinforcing posts bridging the reinforcing strips and the web members.

13. An aerofoil structure of the character set forth in claim 1 wherein leading and trailing edge frames are attached on to the leading edge and trailing edge respectively of the rigid box frame, said leading and trailing edge frames being separate from and independent of the intermediate box-like frame.

14. A wing construction for aircraft comprising a pair of longitudinal beams disposed respectively adjacent the leading and trailing edges of the wing, bulkheads bridging said beams and sheet covers for the upper and lower sides of said beams and bulkheads forming therewith a rigid box-like frame, and separate devices independent of the bulkheads but connected with the box-like structure for giving aerofoil form to the wing and including form members superposed upon the box-like structure.

In testimony whereof, I have signed my name to this specification.

ARTHUR L. THURSTON.